US012095914B2

(12) United States Patent
Shin et al.

(10) Patent No.: US 12,095,914 B2
(45) Date of Patent: Sep. 17, 2024

(54) METHOD FOR STORING DIGITAL KEY AND ELECTRONIC DEVICE

(71) Applicant: Samsung Electronics Co., Ltd., Gyeonggi-do (KR)

(72) Inventors: Inyoung Shin, Gyeonggi-do (KR); Lokesh Gurram, Gyeonggi-do (KR); Jonghyo Lee, Gyeonggi-do (KR); Sooyeon Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 627 days.

(21) Appl. No.: 17/057,995

(22) PCT Filed: May 20, 2019

(86) PCT No.: PCT/KR2019/005979
§ 371 (c)(1),
(2) Date: Nov. 23, 2020

(87) PCT Pub. No.: WO2019/225921
PCT Pub. Date: Nov. 28, 2019

(65) Prior Publication Data
US 2021/0203498 A1 Jul. 1, 2021

(30) Foreign Application Priority Data

May 23, 2018 (KR) .......................... 10-2018-0058645

(51) Int. Cl.
*G06F 21/44* (2013.01)
*H04L 9/08* (2006.01)
(Continued)

(52) U.S. Cl.
CPC .......... *H04L 9/0894* (2013.01); *H04L 9/3226* (2013.01); *H04L 9/3263* (2013.01); *H04W 4/80* (2018.02)

(58) Field of Classification Search
CPC ................. H04L 9/0894; H04L 9/3226; H04L 9/3263; H04L 9/083; H04L 9/0897; H04L 9/3234;
(Continued)

(56) References Cited

U.S. PATENT DOCUMENTS 9,264,413 B2  2/2016 Zhang
2015/0100784 A1* 4/2015 Ido ........................ H04L 9/3226
713/168
2015/0373295 A1 12/2015 Outters
(Continued)

FOREIGN PATENT DOCUMENTS

EP  3 013 018        4/2016
EP  3013018 A1 *    4/2016  ........... G06F 21/445
(Continued)

OTHER PUBLICATIONS

KR Notice of Allowance dated Oct. 12, 2023 issued in counterpart application No. 10-2018-0058645, 14 pages.
(Continued)

*Primary Examiner* — Joseph P Hirl
*Assistant Examiner* — Aayush Aryal
(74) *Attorney, Agent, or Firm* — The Farrell Law Firm, P.C.

(57) ABSTRACT

Provided are a method and electronic device for storing a digital key. The electronic device includes: a communicator; a secure element configured to store a digital key and perform authentication related to the digital key; a memory storing a program and data for storing the digital key; and a processor configured to execute the program stored in the memory to perform authentication on a target device and a user of the electronic device by performing short range communication with the target device, generate the digital key for the target device, and store the generated digital key in one region of the secure element.

13 Claims, 14 Drawing Sheets

(51) Int. Cl.
*H04L 9/32* (2006.01)
*H04L 9/40* (2022.01)
*H04W 4/80* (2018.01)
*H04W 12/041* (2021.01)
*H04W 12/069* (2021.01)

(58) Field of Classification Search
CPC .............. H04L 63/0876; H04L 9/3213; H04L 45/02; H04L 63/0869; H04L 63/10; H04W 4/80; H04W 12/041; H04W 12/069; G06F 21/44
See application file for complete search history.

(56) References Cited

U.S. PATENT DOCUMENTS

| | | | |
|---|---|---|---|
| 2017/0118180 A1* | 4/2017 | Takahashi | H04L 63/0227 |
| 2017/0374550 A1* | 12/2017 | Auer | H04W 4/80 |
| 2019/0074964 A1 | 3/2019 | Park et al. | |

FOREIGN PATENT DOCUMENTS

| | | |
|---|---|---|
| EP | 3 062 295 | 8/2016 |
| JP | 2014-099718 | 5/2014 |
| KR | 1020130009544 | 1/2013 |
| KR | 1020160011124 | 1/2016 |
| KR | 1020160046362 | 4/2016 |
| KR | 1020160046559 | 4/2016 |

OTHER PUBLICATIONS

International Search Report dated Aug. 21, 2019 issued in counterpart application No. PCT/KR2019/005979, 16 pages.
Korean Office Action dated Apr. 27, 2023 issued in counterpart application No. 10-2018-0058645, 6 pages.
European Search Report dated Apr. 23, 2021 issued in counterpart application No. 19808027.7-1218, 6 pages.

* cited by examiner

METHOD FOR STORING DIGITAL KEY AND ELECTRONIC DEVICE

PRIORITY

This application is a National Phase Entry of PCT International Application No. PCT/KR2019/005979 which was filed on May 20, 2019, and claims priority to Korean Patent Application No. 10-2018-0058645, which was filed on May 23, 2018, the content of each of which is incorporated herein by reference.

TECHNICAL FIELD

The disclosure relates to a method and electronic device for storing a digital key.

BACKGROUND ART

With the supply of personalized electronic devices, such as smart phones and tablet personal computers (PCs), technologies for performing security, authentication, and the like using digital keys have been developed. As a digital key-related technology, a type of technology in which a digital key is integrated into an electronic device, for example, a smart phone, is being developed.

A digitized virtual key, i.e., a digital key, may be stored in an electronic device and a user of the electronic device may use the digital key, and thus the user does not need to carry a physical separate key to open or close, control, and access a door. For example, a physical vehicle key may be replaced by a digital key.

As such, the use of a digital key can bring great improvements in user convenience and industrial effects, but concerns regarding security have also been raised. In other words, because a digital key basically needs to be combined with an electronic device, the digital keys may be exposed to malicious use such as hacking of the electronic device. Accordingly, there is a need for a method for safely storing a digital key in an electronic device.

DESCRIPTION OF EMBODIMENTS

Technical Problem

Provided are a method and electronic device for storing a digital key.

Solution to Problem

An electronic device for storing a digital key according to an embodiment includes: a communicator; a secure element configured to store a digital key and perform authentication related to the digital key; a memory storing a program and data for storing the digital key; and a processor configured to execute the program stored in the memory to perform authentication on a target device and a user of the electronic device by performing short range communication with the target device, generate the digital key for the target device, and store the generated digital key in one region of the secure element.

A method of storing a digital key according to another embodiment includes: performing authentication on a target device and a user of an electronic device by performing short range communication with the target device; generating the digital key for the target device; and storing the generated digital key in one region of a secure element.

A computer program product according to another embodiment includes a computer-readable recording medium having stored therein a program for: performing authentication on a target device and a user of an electronic device by performing short range communication with the target device; generating the digital key for the target device; and storing the generated digital key in one region of a secure element.

Advantageous Effects of Disclosure

According to an embodiment of the disclosure, a method and electronic device for storing a digital key are provided.

BEST MODE

Figure 1:
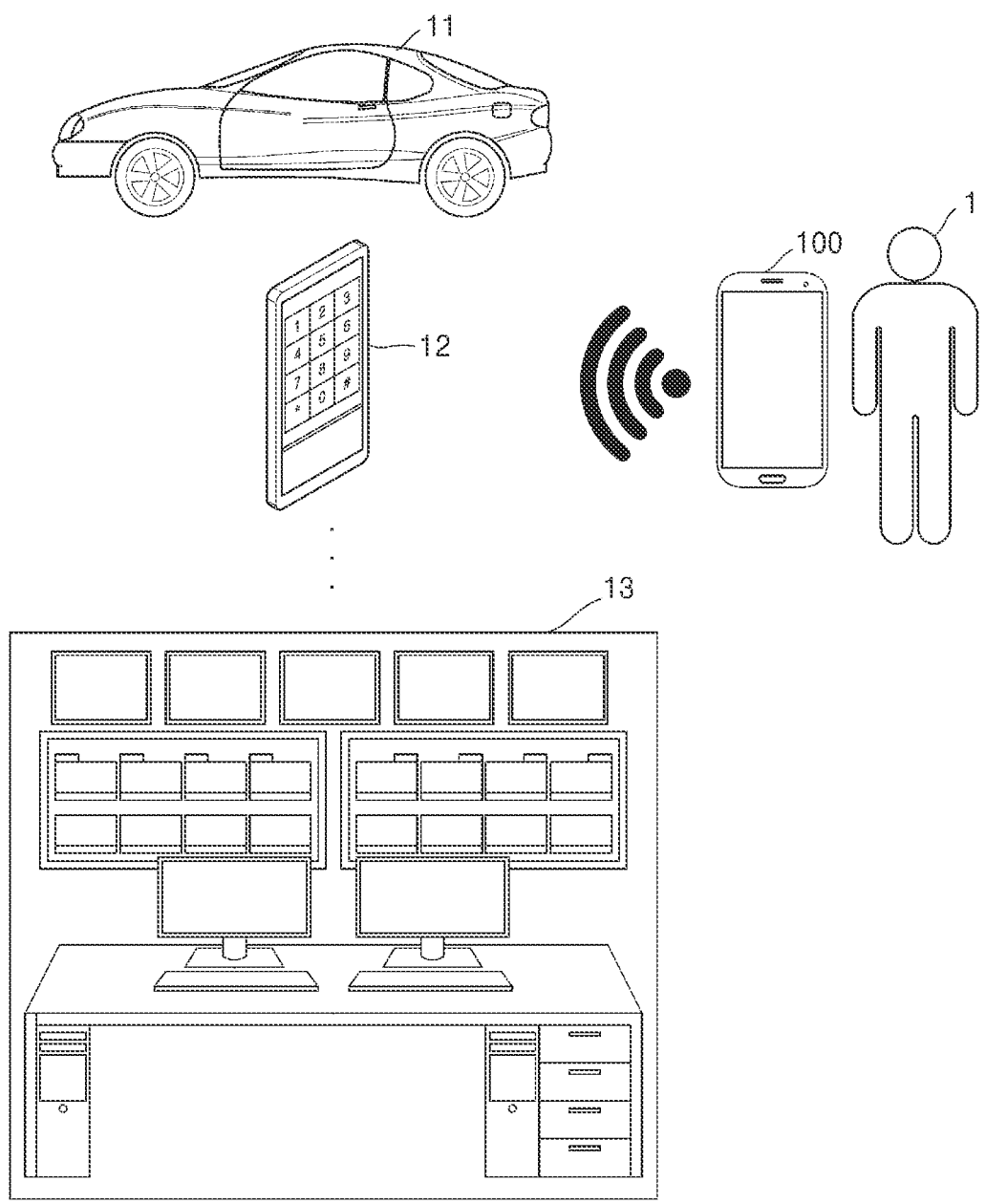
FIG. 1 is a diagram for describing an environment where a digital key is applied.

An electronic device for storing a digital key according to an embodiment includes: a communicator; a secure element configured to store a digital key and perform authentication related to the digital key; a memory storing a program and data for storing the digital key; and a processor configured to execute the program stored in the memory to perform authentication on a target device and a user of the electronic device by performing short range communication with the target device, generate the digital key for the target device, and store the generated digital key in one region of the secure element.

According to an embodiment, the processor may be further configured to execute the program to store the generated digital key in a common storage space of the secure element by distinguishing the generated digital key for each of at least one service provider and update a routing table regarding the generated digital key.

According to an embodiment, the processor may be further configured to execute the program to activate the digital key and perform authentication between a common application in the secure element and a service provider server by connecting the common application and the service provider server.

According to an embodiment, the processor may be further configured to execute the program to, when a request related to the digital key is received from the service provider server, identify, based on the routing table, a storage location of the digital key in the service provider server and an access authority of the service provider server regarding the digital key, and when the service provider server has the access authority, control the common application to generate a response to the request related to the digital key and transmit the response to the service provider server.

According to an embodiment, the processor may be further configured to execute the program to generate, in one region of the secure element, a dedicated storage space that is functionally isolated to store the digital key for each if at least one service provider or for each of at least one target device, install, in the dedicated storage space, a dedicated application for providing a service regarding the digital key, store the generated digital key in the dedicated storage space by distinguishing the generated digital key for each of at least one service provider, and update a routing table regarding the generated digital key.

According to an embodiment, the processor may be further configured to execute the program to: activate the digital key and perform authentication between a common application in the secure element and a service provider server by connecting the common application and the service provider server.

According to an embodiment, the processor may be further configured to execute the program to: receive access authority information of the service provider server from a digital key manager server and receive a verification token from the target device; when a request related to the digital key is received from the service provider server, control the common application to identify, based on the routing table, a storage location of the digital key in the service provider server and an access authority of the service provider server regarding the digital key; and when the service provider server has the access authority regarding the digital key, control the dedicated application to generate a response to the request related to the digital key by using the verification token and transmit the response to the service provider server.

According to an embodiment, the processor may be further configured to execute the program to generate, in one region of the secure element, a dedicated secure domain that is functionally isolated and accessible when a use authority is verified to store the digital key for each of at least one service provider or for each of at least one target device, install, in the dedicated secure domain, a dedicated application for providing a service regarding the digital key, and store the generated digital key in the dedicated secure domain by distinguishing the generated digital key for each of at least one service provider.

According to an embodiment, the processor may be further configured to execute the program to activate the digital key and perform authentication between the dedicated application in the secure element and a service provider server by connecting the dedicated application and the service provider server.

According to an embodiment, the processor may be further configured to execute the program to: transmit, to a digital key manager server, a verification token for accessing the dedicated secure domain; and when the verification token and a request related to the digital key are received from the service provider server, perform verification regarding the verification token and when the verification token is valid, control the dedicated application to generate a response to the request related to the digital key and transmit the response to the service provider server.

A method of storing a digital key according to another embodiment includes: performing authentication on a target device and a user of an electronic device by performing short range communication with the target device; generating the digital key for the target device; and storing the generated digital key in one region of a secure element.

According to an embodiment, the storing of the generated digital key may include: storing the generated digital key in a common storage space of the secure element by distinguishing the generated digital key for each of at least one service provider; and updating a routing table regarding the generated digital key.

According to an embodiment, the method may further include: activating the digital key; and performing authentication between a common application in the secure element and the service provider server by connecting the common application and the service provider server.

According to an embodiment, the method may be further include: when a request related to the digital key is received from the service provider server, identifying, based on the routing table, a storage location of the digital key in the service provider server and an access authority of the service provider server regarding the digital key; and when the service provider server has the access authority, generating a response to the request related to the digital key and transmitting the response to the service provider server.

According to an embodiment, the method may further include: before the generating of the digital key, generating a dedicated storage space that is functionally isolated to store, in one region of the secure element, the digital key for each of at least one service provider or for each of at least one target device; and installing, in the dedicated storage space, a dedicated application for providing a service regarding the digital key, wherein the storing of the generated digital key may include storing the generated digital key in the dedicated storage space by distinguishing the generated digital key for each of at least one service provider.

According to an embodiment, the method may further include: activating the digital key; and performing authentication between a common application in the secure element and the service provider server by connecting the common application and the service provider server.

According to an embodiment, the method may further include; before the performing of the authentication, receiving access authority information of the service provider server from a digital key manager server; and before the generating of the digital key, receiving a verification token from the target device, and may further include: when a request related to the digital key is received from the service provider server, identifying, based on the routing table, a storage location of the digital key in the service provider server and an access authority of the service provider server regarding the digital key; and when the service provider server has the access authority regarding the digital key, generating a response to the request related to the digital key by using the verification token and transmitting the response to the service provider server.

According to an embodiment, the method may further include: before the generating of the digital key, generating a dedicated secure domain that is functionally isolated and accessible when a use authority is verified to store, in one region of the secure element, the digital key for each of at least one service provider or for each of at least one target device; and installing, in the dedicated secure domain, a dedicated application for providing a service regarding the digital key, wherein the storing of the generated digital key may include storing the generated digital key in the dedicated secure domain by distinguishing the generated digital key for each of at least one service provider.

According to an embodiment, the method may further include: activating the digital key; and performing authentication between the dedicated application in the secure element and the service provider server by connecting the dedicated application and the service provider server.

According to an embodiment, the method may further include: transmitting, to a digital key manager server, a verification token for accessing the dedicated secure domain; when the verification token and a request related to the digital key are received from the service provider server, performing verification regarding the verification token; and when the verification token is valid, generating a response to the request related to the digital key and transmitting the response to the service provider server.

A computer program product according to another embodiment includes a computer-readable recording medium having stored therein a program for: performing authentication on a target device and a user of an electronic device by performing short range communication with the target device; generating the digital key for the target device; and storing the generated digital key in one region of a secure element.

MODE OF DISCLOSURE

Hereinafter, embodiments of the disclosure will be described in detail with reference to the accompanying drawings such that one of ordinary skill in the art may easily implement the disclosure. However, the disclosure may be implemented in various different forms and is not limited to the embodiments described herein. Also, in the drawings, parts irrelevant to the description are omitted in order to clearly describe the disclosure, and like reference numerals designate like elements throughout the specification.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ conventional techniques for electronic environment setting, signal processing, and/or data processing.

In addition, a connection line or a connection member between components shown in drawings is merely a functional connection and/or a physical or circuit connection. In an actual device, connections between components may be represented by various functional connections, physical connections, or circuit connections that are replaceable or added.

In addition, terms such as "unit" and "module" described in the present specification denote a unit that processes at least one function or operation, which may be implemented in hardware or software, or implemented in a combination of hardware and software. The "unit" or "module" is stored in an addressable storage medium and may be implemented by a program executable by a processor. For example, the "unit" or "module" may be implemented by software components, object-oriented software components, class components, and task components, and may include processes, functions, attributes, procedures, subroutines, segments of program code, drivers, firmware, micro codes, circuits, data, a database, data structures, tables, arrays, or variables.

FIG. 1 is a diagram for describing an environment where a digital key is applied.

FIG. 1 illustrates an electronic device 100, a user 1 of the electronic device, and target devices 11 through 13 for performing control and access by using a digital key loaded in the electronic device 100.

The electronic device 100 may include a personalized mobile device, but is not limited thereto and may include various types of electronic devices. For example, the electronic device 100 may include a smart phone, a tablet personal computer (PC), a PC, a camera, or a wearable device. According to an embodiment, the electronic device 100 may generate and store the digital key for controlling and accessing the target devices 11 through 13.

The target devices 11 through 13 may perform an operation for generating the digital key by interacting with the electronic device 100 and may be controlled and accessed by using the digital key generated through such an operation and stored in the electronic device 100. According to an embodiment, the target devices 11 through 13 may perform the operation for generating the digital key via a short range communication with the electronic device 100 within a certain distance.

For example, when a target device is a vehicle 11, the user 1 may generate the digital key by interacting the electronic device 100 with the vehicle 11 and store the generated digital key in the electronic device 100. The user 1 may control various operations of the vehicle 11 by using the digital key stored in the electronic device 100. For example, by using the digital key stored in the electronic device 100, the user 1 may open or close a door, start an engine, or control various electronic devices provided in the vehicle 11. In addition, an operation related to autonomous driving, such as an automatic parking system, may be controlled. When a target device is a door lock 12, a lock may be opened or closed by using the digital key stored in the electronic device 100, and when a target device is a control system 13, the user 1 may be authenticated via the digital key and different levels of authority may be assigned according to the authenticated user 13.

The embodiments shown in FIG. 1 is only an example and the scope of the disclosure is not limited by those shown in FIG. 1. For example, various target devices may be present in addition to the target devices 11 through 13 shown in FIG. 1.

Figure 2:
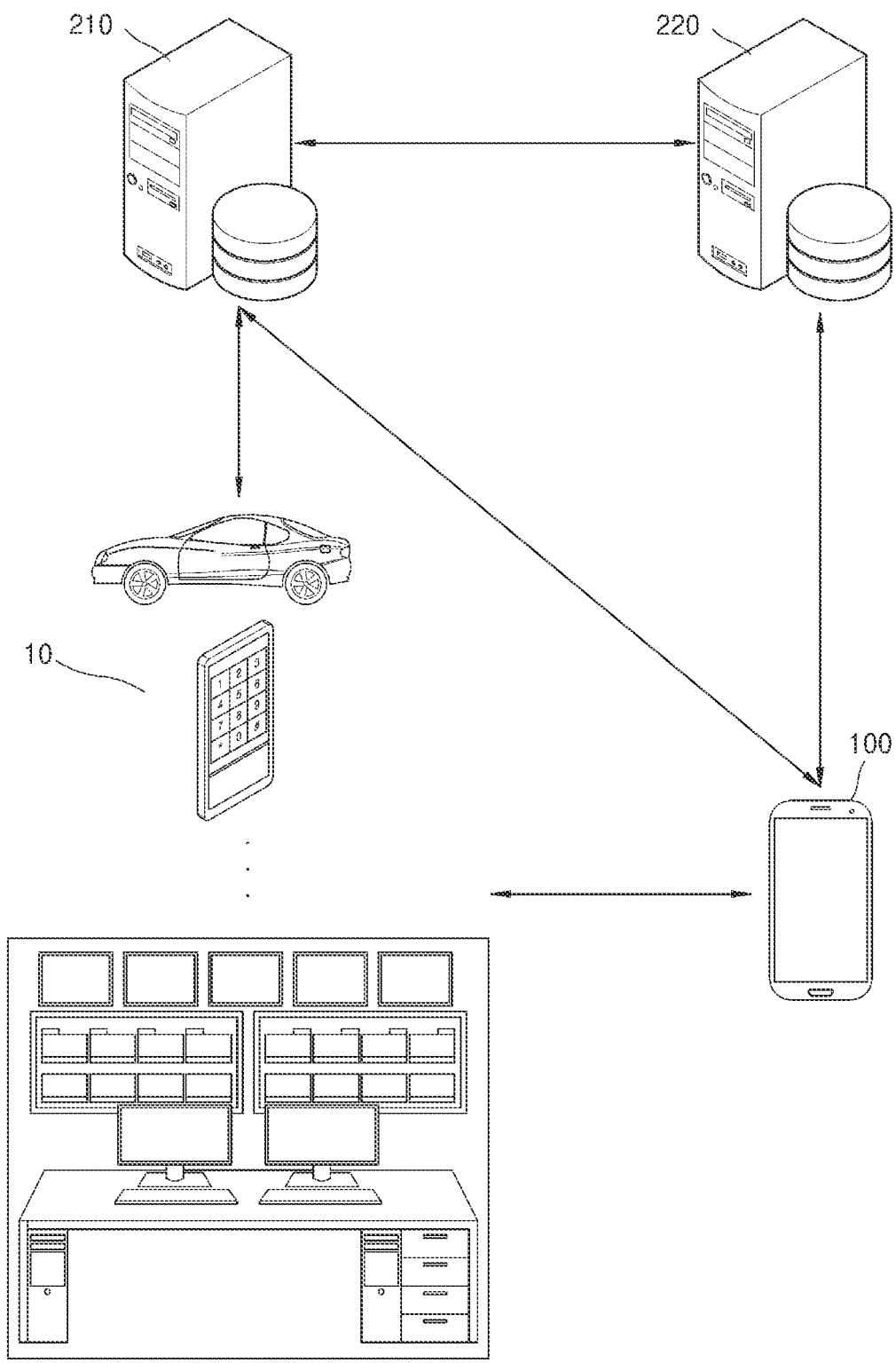
FIG. 2 is a diagram for describing a system to which an embodiment is applied.

FIG. 2 is a diagram for describing a system to which an embodiment is applied.

FIG. 2 illustrates a service provider server 210, a digital key manager server 220, the electronic device 100, and a target device 10.

The service provider server 210 is a server of a service provider who is to provide a digital key service to the user 1. The service provider denotes, for example, an operator who provides a service related to a vehicle, a hotel, a house, a building, or the like, and may provide the digital key service to the user 1 as an additional service according to a main service. For example, a vehicle company sells vehicles and a hotel, house, or building company provides hotel, house, building-related services. Such a service provider may provide the digital key service for an access function, such as opening or closing a door, starting an engine, or controlling.

The service provider server 210 may include a user information database including user account information such as identification (ID) or password of the user 1, or sales product or service information. For example, the vehicle company may store, when selling a vehicle, information about ID and password of the user 1, an ID number of the sold vehicle, and whether the digital key service is used.

The digital key manager server 220 provides a technology and service for safely issuing and storing the digital key in the electronic device 100. For example, when the user 1 is to purchase a vehicle and store a digital key in the electronic device 100, the digital key manager server 220 may identify whether the user 1 is a valid user and whether the vehicle is a valid vehicle, generate and store the digital key in the electronic device 100, and manage the stored digital key.

The target device 10 is an entity corresponding to a product and service sold by the service provider to the user 1. For example, the target device 10 may include a door of a vehicle, hotel, house, building, or the like. In particular, the target device 10 may include not only a door or trunk door of the vehicle, but also an access gate for starting or controlling the vehicle.

The electronic device 100 may generate and store the digital key in a secure element (SE). In addition, the electronic device 100 may authenticate an access of an external entity, such as the service provider server 210, to the digital key and provide a function of safely managing the digital key by verifying authority.

Figure 3:
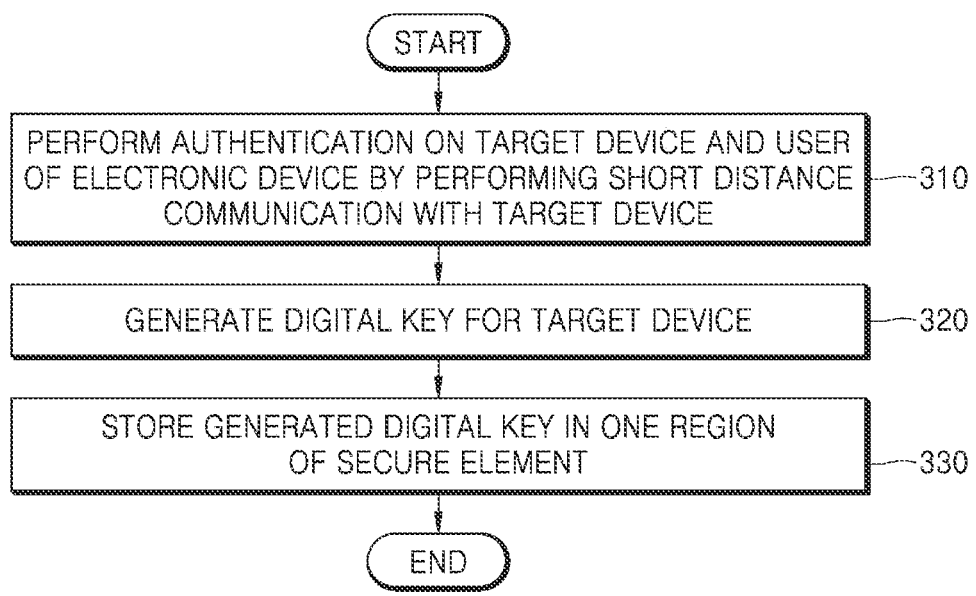
FIG. 3 is a diagram for describing a method of storing a digital key, according to an embodiment.

FIG. 3 is a diagram for describing a method of storing a digital key, according to an embodiment.

Referring to FIG. 3, first in operation 310, the electronic device 100 performs authentication on the target device 10 and a user of the electronic device 100 by performing short range communication with the target device 10. According to an embodiment, the electronic device 100 may perform the authentication on the target device 10 and the user of the electronic device 100 by receiving a certificate of the target device 10 from the target device 10 and comparing the received certificate with a stored certificate. Here, the certificate may include a root certificate of the target device 10. Also, the electronic device 100 may receive and store the certificate of the target device 10 from the digital key manager server 220 and use the certificate for authentication of the target device 10. According to an embodiment, for authentication of the user of the electronic device 100, the target device 10 may obtain and use user ID, a password, a one time passcode (OTP), a personal identification number (PIN), a voice command, biometric information, global positioning system (GPS) information, and existing ownership authentication information.

According to an embodiment, the electronic device 100 may perform authentication on the target device 10 and the user of the electronic device 100 by using proximity communication, for example, near field communication (NFC). Also, according to an embodiment, the electronic device 100 may store the certificate in an SE. A secure region such as the SE has a large restriction in terms of resources or storage spaces compared to a general region of the electronic device 100. Thus, according to another embodiment, the electronic device 100 may encrypt the certificate by using a key stored in the SE and store the encrypted certificate in a general region instead of the secure region. In this case, to use the certificate, the certificate may be decrypted in the SE. According to an embodiment, even when the certificate is stored in the general region, the certificate is encrypted by the key stored in the SE and thus may be safely stored from stealing or hacking. Also, the certificate may be bound to a particular service by using a key related to the particular service in the SE.

Then, in operation 320, the electronic device 100 generates a digital key for the target device 10. According to an embodiment, the electronic device 100 may use the digital key to access the target device 10 and control the target device 10.

In operation 330, the electronic device 100 stores the generated digital key in one region of the SE.

According to an embodiment, the electronic device 100 may store the generated digital key in a common storage space of the SE by distinguishing the generated digital key for each service provider and update a routing table regarding the digital key. Here, the common storage space is a space accessible by each service provider server 210 via a request for a common application and digital keys of service providers may be distinguishably stored. According to an embodiment, the electronic device 100 may distinguishably store the digital keys of the service providers according to delimiters and here, the delimiter may be an index. Information of the index may be stored in the routing table. Accordingly, to access the digital key, an index of the routing table is required. Also, the routing table may be updated when a digital key is newly generated or information related to a digital key is changed. According to an embodiment, the routing table may include an index of a digital key, state information (for example, active/inactive), ID information (for example, a service provider or a target device), and the like.

In addition, the electronic device 100 may activate the digital key and perform authentication between the common application in the SE and the service provider server 210 by connecting the common application and the service provider server 210. According to an embodiment, the electronic device 100 may activate the digital key via registration, additional authentication, or the like in the service provider server 210 and/or the digital key manager server 220. In this case, the electronic device 100 may store the state information of the digital key and when an activation process is required, store the state information of the digital key as inactive. According to an embodiment, when the electronic device 100 is located in a region connectable to a network, i.e., in a region where communication is possible, activation may be performed by immediately connecting to the network. However, when the electronic device 100 is located in a gray region, the activation may be performed when the electronic device 100 is moved to the region where communication is possible. In this regard, the digital key that needs to be activated and related information may be stored in a service framework 520 of FIG. 5.

According to an embodiment, when a request related to the digital key is received from the service provider server 210, the electronic device 100 may identify a storage location of the digital key in the service provider server 210 and an access authority of the service provider server 210 to the digital key, based on the routing table. When the service provider server 210 has the access authority, the electronic device 100 may generate a response to the request related to the digital key and transmit the response to the service provider server 210.

According to an embodiment, the digital keys of the service provider servers 210 may be stored in a common storage apparatus in the SE, i.e., the secure region, by dividing the common storage apparatus. When each service provider is to access the digital key, the digital key may be safely stored by authenticating the service provider, identifying authority by referring to the routing table of the digital key, and then allowing an access.

According to another embodiment, before generating the digital key for the target device 10, the electronic device 100 may generate, in one region of the SE, a dedicated storage space that is functionally isolated to store a digital key for each service provider or for each target device and install a dedicated application for providing a service regarding the digital key in the dedicated storage space. Here, while storing the generated digital key in one region of the SE, the electronic device 100 may store the generated digital key in the dedicated storage space for each service provider and update the routing table regarding the generated digital key.

In addition, the electronic device 100 may activate the digital key and perform authentication between the common application in the SE and the service provider server 210 by connecting the common application and the service provider server 210.

In this case, before performing the authentication on the target device 10 and the user of the electronic device 100 by performing the short range communication with the target device 10, the electronic device 100 may receive access authority information of the service provider server 210 from the digital key manager server 220. Here, the access authority information is about an access authority when the service provider server 210 accesses the common application, and for example, may include an access number of times, an access command, and a validity date. Also, the electronic device 100 may receive a verification token from the target device 10 before generating the digital key for the target device 10. Here, the verification token may be used to verify communication with the service provider server 210. According to an embodiment, when the request related to the digital key is received from the service provider server 210, the electronic device 100 may identify the storage location of the digital key in the service provider server 210 and the access authority of the service provider server 210 to the digital key, based on the routing table. Also, when the service provider server 210 has the access authority regarding the digital key, the electronic device 100 may generate the response to the request related to the digital key by using the verification token and transmit the response to the service provider server 210.

In particular, the request related to the digital key from the service provider server 210 may be transmitted together with a challenge for identifying whether the dedicated storage space corresponding to the service provider server 210 is accessed. The electronic device 100 may transmit, to the service provider server 210, a result regarding the challenge together with the response to the request related to the digital key, by using the verification token.

According to an embodiment, digital keys of service providers may be stored in the dedicated storage spaces that are safely divided. When each service provider is to access the digital key, the digital key may be safely stored by authenticating the service provider, identifying authority of the service provider by referring to the routing table of the digital key, and then allowing an access to a particular dedicated storage space. Moreover, the service provider may identify, via the service provider server 210 through the challenge, whether the response from the electronic device 100 is about the digital key stored in the dedicated storage space corresponding to the service provider.

According to another embodiment, before generating the digital key for the target device 10, the electronic device 100 may generate, in one region of the SE, a dedicated secure domain that is functionally isolated and accessible when a use authority is verified to store a digital key for each service provider or for each target device and install a dedicated application for providing a service regarding the digital key in the dedicated secure domain. Here, while storing the generated digital key in one region of the SE, the electronic device 100 may store the generated digital key in the dedicated secure domain by distinguishing the generated digital key for each service provider.

In addition, the electronic device 100 may activate the digital key and perform authentication between the dedicated application in the SE and the service provider server 210 by connecting the dedicated application and the service provider server 210.

In this case, the electronic device 100 may transmit, to the digital key manager server 220, a verification token for accessing the dedicated secure domain and perform verification on the verification token when a request related to the digital key is received together with the verification token from the service provider server 210. When the verification token is valid, the electronic device 100 may generate a response to the request related to the digital key and transmit the response to the service provider server 210.

According to an embodiment, digital keys of service providers may be separately stored in the dedicated secure domain by safely dividing the digital keys. When each service provider is to access the digital key, the digital key may be safely stored by authenticating the service provider and allowing an access to a particular dedicated secure domain. In addition, the electronic device 100 may identify whether the access of the service provider is valid by using the verification token received by the service provider server 210 from the electronic device 100.

Hereinabove, operations of an electronic device have been described. Hereinbelow, a configuration of the electronic device will be described. Here, details overlapping those described with reference to the operations of the electronic device are briefly described.

Figure 4:
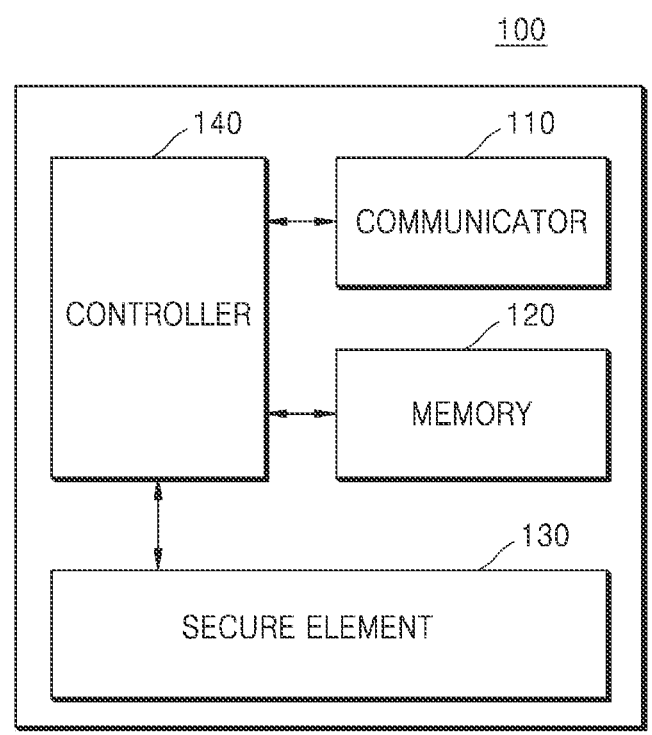
FIG. 4 is a diagram showing a configuration of an electronic device for storing a digital key, according to an embodiment.

FIG. 4 is a diagram showing a configuration of an electronic device for storing a digital key, according to an embodiment.

Referring to FIG. 19, the electronic device 100 may include a communicator 110, a memory 120, a secure element 130, and a processor 140.

The communicator 110 may perform wired/wireless communication with another device or network. In this regard, the communicator 110 may include a communication module supporting at least one of various wired/wireless communication methods. For example, the communication module may be in a form of a chipset or may be a sticker/barcode (for example, a sticker including a NFC tag) including information required for communication.

The wireless communication may include, for example, at least one of cellular communication, wireless fidelity (Wi-Fi), Wi-Fi direct, Bluetooth, ultra wide band (UWB), or NFC. The wired communication may include, for example, at least one of universal serial bus (USB) or high definition multimedia interface (HDMI).

According to an embodiment, the communicator 110 may include a communication module for short range communication. For example, the communicator 110 may include a communication module for performing various short range communications, such as infrared communication, magnetic secure transmission (MST), and magnetic secure communication, in addition to Wi-Fi, Wi-Fi direct, Bluetooth, and NFC described above.

A program such as an application and various types of data such as a file may be installed and stored in the memory 120. The processor 140 may access and use the data stored in the memory 120 or may store new data in the memory 120. According to an embodiment, a program and data for storing a digital key may be installed and stored in the memory 120.

The secure element 130 is a secure region to which only an authenticated application is accessible. The secure element 130 may be configured to be physically isolated from another hardware configuration. According to an embodiment, the program and data for storing the digital key may be installed and stored in the secure element 130. According to an embodiment, the secure element 130 may include an embedded secure element (eSE), a universal integrated circuit card (UICC), or a secure digital (SD) card. According to an embodiment, the secure element 130 may store the digital key and perform authentication related to the digital key.

In addition, FIG. 3 illustrates that the secure element 130 is connected to the processor 140, but an embodiment is not limited thereto and the secure element 130 may be connected to the communicator 110 and/or the memory 120.

The processor 140 may control overall operations of the electronic device 100 and include at least one processor, such as a central processing unit (CPU) or a graphics processing unit (GPU). The processor 140 may control other components included in the electronic device 00 to perform an operation for storing the digital key. For example, the processor 140 may execute a program stored in the memory 120 and the secure element 130, read a file stored in the memory 120 and the secure element 130, or store a new file in the memory 120 and the secure element 130. In addition, FIG. 3 illustrates that the processor 140 of the electronic device 100 is located outside the secure element 130, but an embodiment is not limited thereto, and the processor 140 may include a processor located inside the secure element 130 for operations of the secure element 130 or the processor 140 in the disclosure may be a processor located inside the secure element 130.

According to an embodiment, the processor 140 may execute the programs stored in the memory 120 and the secure element 130 to perform authentication on the target device 10 and the user of the electronic device 100 by performing short range communication with the target device 10, generate the digital key for target device 10e t, and store the generated digital key in one region of the secure element 130.

According to an embodiment, the processor 140 may store the generated digital key in a common storage space of the secure element 130 by distinguishing the generated digital key for each service provider and update a routing table regarding the generated digital key. Also, the processor 140 may activate the digital key and perform authentication between the common application in the secure element 130 and the service provider server 210 by connecting the common application and the service provider server 210. In addition, the processor 140 may, when a request related to the digital key is received from the service provider server 210, identify, based on the routing table, a storage location of the digital key in the service provider server 210 and an access authority of the service provider server 210 regarding the digital key, and when the service provider server 210 has the access authority, control the common application to generate a response to the request related to the digital key and transmit the response to the service provider server 210.

According to another embodiment, the processor 140 may generate, in one region of the secure element 130, a dedicated storage space that is functionally isolated to store the digital key for each service provider or for each target device and install a dedicated application for providing a service related to the digital key in the dedicated storage space. Also, the processor 140 may store the generated digital key in the dedicated storage space by distinguishing the generated digital key for each service provider and update the routing table regarding the generated digital key. Also, the processor 140 may activate the digital key and perform authentication between the common application in the secure element 130 and the service provider server 210 by connecting the common application and the service provider server 210. In addition, the processor 140 may receive access authority information of the service provider server 210 from the digital key manager server 220 and receive a verification token from the target device 10. Also, the processor 140 may, when the request related to the digital key is received from the service provider server 210, control the common application to identify, based on the routing table, the storage location of the digital key in the service provider server 210 and an access authority of the service provider server 210 regarding the digital key, and when the service provider server 210 has the access authority to the digital key, control the dedicated application to generate the response to the request related to the digital key by using the verification token and transmit the response to the service provider server 210.

According to another embodiment, the processor 140 may generate, in one region of the secure element 130, a dedicated secure domain that is functionally isolated and accessible when a use authority is verified to store the digital key for each service provider or for each target device and install a dedicated application for providing a service related to the digital key in the dedicated secure domain. The generated digital key may be stored in the dedicated secure domain by distinguishing the generated digital key for each service provider. Also, the processor 140 may activate the digital key and perform authentication between the dedicated application in the secure element 130 and the service provider server 210 by connecting the dedicated application and the service provider server 210. Moreover, the processor 140 may transmit, to the digital key manager server 220, a verification token for accessing the dedicated secure domain and perform verification on the verification token when a request related to the digital key and the verification token are received from the service provider server 210. When the verification token is valid, the processor 140 may control the dedicated application to generate a response to the request related to the digital key and transmit the response to the service provider server 210.

Figure 5:
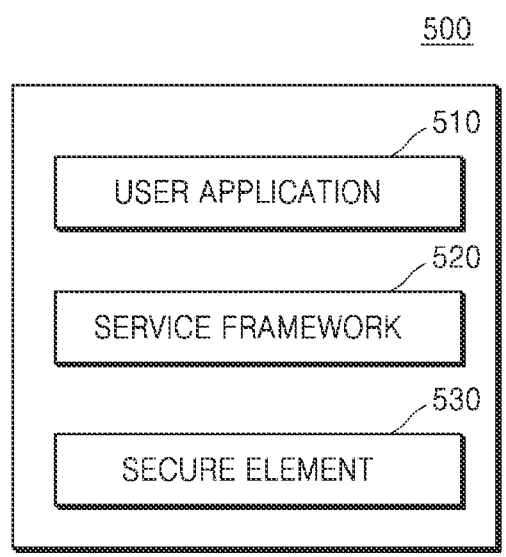
FIG. 5 is a diagram showing a system architecture of an electronic device, according to an embodiment.

FIG. 5 is a diagram showing a system architecture of an electronic device, according to an embodiment.

Referring to FIG. 5, a system architecture of an electronic device according to an embodiment includes a user application 510, the service framework 520, and a secure element 530.

The user application 510 denotes an application stored and installed in a general region of the electronic device 100. According to an embodiment, the user application 510 may include an application provided by a service provider to store a digital key, an application embedded in the electronic device 100 to store a digital key, and the like. For example, the user application 510 may include an application in a form of a wallet.

The service framework 520 is a service application functioning as a gateway between the secure element 530 and the user application 510, an external entity, or the like. According to an embodiment, the service framework 520 may provide a service application programming interface (API) accessible to the secure element 530 from the outside and provide functions, such as access control, instruction conversion, and the like when the secure element 530 is accessed.

The secure element 530 is a secure region to which only an authenticated application is accessible. The secure element 530 may be configured to be physically isolated from another hardware configuration. According to an embodiment, the secure element 530 may include a eSE, UICC, or SD card. The secure element 530 may include at least one component. This will be described in detail below.

Figure 6:
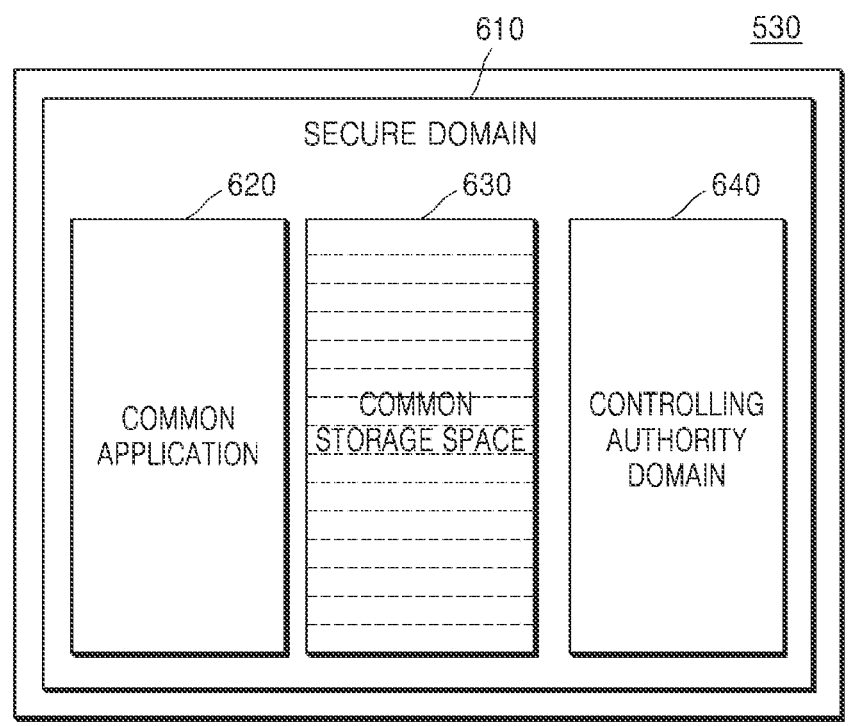
FIG. 6 is a diagram showing a system architecture of a secure element, according to an embodiment.

FIG. 6 is a diagram showing a system architecture of a secure element, according to an embodiment.

Referring to FIG. 6, the secure element 530 includes a secure domain 610, and the secure domain 610 may include a common application 620, a common storage space 630, and a controlling authority domain 640.

The secure domain 610 is a completely isolated space in the secure element 530 and performs security-related operations.

The common application 620 includes an applet or application driven in the secure element 530. In a digital key-related service, the common application 620 may provide functions, such as generation and management of a digital key, to several service providers in a shared form. The common application 620 may be pre-provided in the electronic device 100 or may be loaded or installed later upon a user request.

The common storage space 630 is a storage space located in the common application 620 or the secure element 530. FIG. 6 illustrates that the common storage space 630 is located outside the common application 620, but an embodiment is not limited thereto, and the common storage space 630 may be located inside the common application 620. According to an embodiment, the common storage space 630 may include a general file system. The common storage space 630 is a space accessible by each service provider server 210 via a request for the common application 620 and digital keys of service providers may be distinguishably stored. According to an embodiment, the common storage space 630 may distinguishably store the digital keys of the service providers according to delimiters and here, the delimiter may be an index. Information of the index may be stored in a routing table. According to an embodiment, the routing table may be stored in the common application 620.

The controlling authority domain 640 may store a certificate required for authentication with an external entity.

Figure 7:
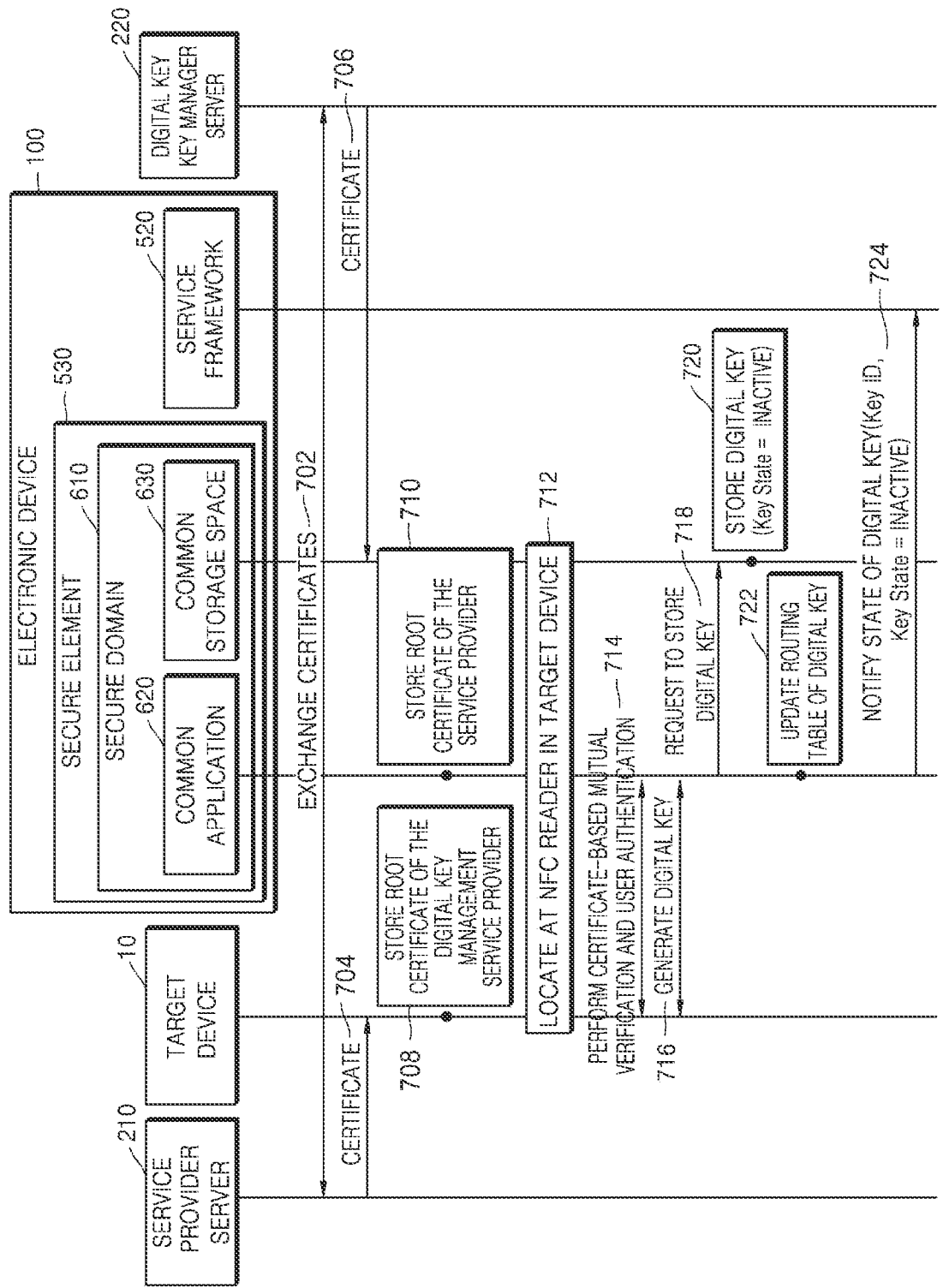
FIGS. 7 and 8 are detailed flowcharts of a method of storing a digital key, according to an embodiment.
Figure 8:
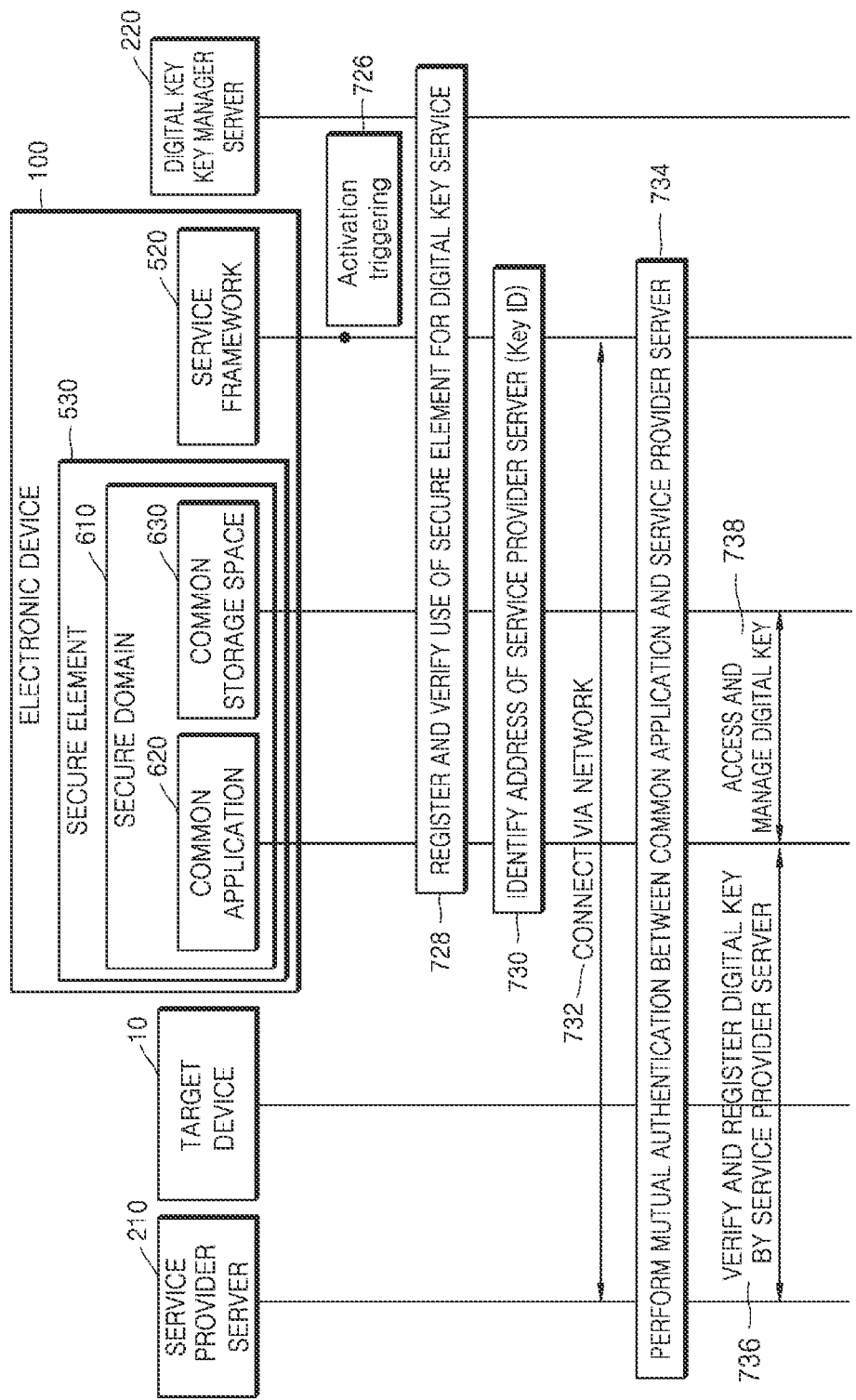

FIGS. 7 and 8 are detailed flowcharts of a method of storing a digital key, according to an embodiment.

Referring to FIGS. 7 and 8, first, in operation 702, the service provider server 210 and the digital key manager server 220 exchange certificates with each other. When a particular service provider is to store a digital key in the electronic device 100 and provide a digital key service to the target device 10, the certificates may be exchanged according to a contract between the service provider and a digital key manager. Here, the service provider server 210 may be a server operated by the service provider providing the target device 10 and the digital key manager server 220 may be a server operated by a person who provides a digital key management service. For example, the person who provides the digital key management service may be a manufacturer of the electronic device 100. According to an embodiment, the certificate may include a root certificate. The service provider server 210 may transmit a root certificate of the service provider to the digital key manager server 220 and the digital key manager server 220 may transmit a root certificate of a digital key management service provider to the service provider server 210. In other words, the service provider and the digital key manager may exchange each other's root certificates.

Then, in operation 704, the service provider server 210 may transmit, to the target device 10, the root certificate of the digital key management service provider received in operation 702, and the target device 10 may store the received root certificate of the digital key management service provider. In operation 706, the digital key manager server 220 may transmit, to the electronic device 100, the root certificate of the service provider received in operation 702, and the electronic device 100 may store the root certificate of the service provider received in operation 710. Here, the electronic device 100 may store the received root certificate of the service provider in the common application 620. However, a secure region such as a secure element (SE) has a large restriction in terms of resources or storage spaces compared to a general region of the electronic device 100. Thus, according to another embodiment, the electronic device 100 may encrypt the certificate by using a key stored in the SE and store the encrypted certificate in a general region instead of the secure region. In this case, to use the certificate, the certificate may be decrypted in the SE. According to an embodiment, even when the certificate is stored in the general region, the certificate is encrypted by the key stored in the SE and thus may be safely stored from stealing or hacking. Also, the certificate may be bound to a particular service by using a key related to the particular service in the SE.

In operation 712, the target device 10 and the electronic device 100 are located within a distance capable of short range communication. For example, the electronic device 100 may be located at an NFC reader of the target device 10. Here, the target device 10 and the common application 620 of the electronic device 100 are connected, and in operation 714, authentication may be performed on the target device 10 and a user of the electronic device 100. Here, the authentication on the target device 10 may be performed via certificate-based mutual verification. The certificate-based mutual verification involves each device or each application authenticating a counterpart device, and according to an embodiment, a stored counterpart's certificate (or root certificate) may be used. According to an embodiment, the service provider server 210 and the digital key manager server 220 may transmit their root signatures to each other and verify the root signatures with the stored counterpart's certificate. Accordingly, it may be verified whether the counterpart is known, for example, is contracted. Alternatively, when a signature and a certificate signed with a root certificate are transmitted together, the counterpart may identify the root certificate and verify the signature with the certificate. According to an embodiment, the electronic device 100 may obtain and transmit, to the target device 10, user ID, password, OTP, PIN, a voice command, biometric information, GPS information, and existing ownership authentication information, for authentication by the target device 10 on the user of the electronic device 100. The target device 10 may identify, based on such information, whether the user who is to store the digital key in the electronic device 100 is an intended user.

When the authentication on the target device 10 and the user of the electronic device 100 is completed in operation 714, the common application 620 generates a digital key in operation 716 and requests the common storage space 630 to store the digital key in operation 718. In operation 720, the common storage space 630 may store the generated digital key. According to an embodiment, one region of the common storage space 630 where the digital key is stored and the digital key may each be activated via registration and/or additional authentication by the digital key manager server 220 or the service provider server 210. Accordingly, state information of the digital key may be stored in the common storage space 630 where the digital key is stored. When an activation process of the digital key is required, initial state information is stored as an inactive state.

Then, in operation 722, the common application 620 updates a routing table of the digital key. According to an embodiment, the electronic device 100 may distinguishably store the digital keys of the service providers according to delimiters and here, the delimiter may be an index. Information of the index may be stored in the routing table. Accordingly, to access the digital key, an index of the routing table is required. Also, the routing table may be updated when a digital key is newly generated or information related to a digital key is changed. According to an embodiment, the routing table may include an index, state information (active/inactive), ID information, and the like of the digital key.

According to an embodiment, when the electronic device 100 is located in a region connectable to a network, i.e., in a region where communication is possible, activation may be performed by immediately connecting to the network. However, when the electronic device 100 is located in a gray region, the activation may be performed when the electronic device 100 is moved to the region where communication is possible. In this regard, in operation 724, the digital key that needs to be activated and related information may be stored in the service framework 520.

In operation 726, when the electronic device 100 enters the region connectable to the network, i.e., the region where communication is possible, the service framework 520 may automatically or manually trigger that activation is required. For example, when the user transmits an activation request command by identifying an inactive digital key list or when the service framework 520 identifies entrance into the region connectable to the network, i.e., the region where communication is possible, while monitoring network information, activation triggering may automatically start.

Operation 728 is a process of registering and verifying the use of a secure element for the digital key service. When the activation triggering of the service framework 520 starts in operation 726, activation may be performed by connecting the common application 620 and the digital key manager server 220. For example, the activation may be performed based on a server according to the policy of the digital key manager or may be self-performed by the electronic device 100.

In operation 730, to perform the activation based on the service provider server 210, an address of the service provider server 210 stored in the common storage space 630 may be identified. Then, when the electronic device 100 and the service provider server 210 are connected via a network in operation 732, mutual authentication between the common application 620 and the service provider server 210 is performed in operation 734 as the service framework 520 performs a function of a massage forwarder. When the mutual authentication between the common application 620 and the service provider server 210 is completed, the common application 620 and the service provider server 210 is logically connected to each other and exchange messages with each other.

In operation 736, the service provider server 210 requests a service related to the digital key via a message, and the common application 620 identifies a storage location of the digital key stored in a common storage space and an access authority to the digital key by referring to the routing table of the digital key, generates a response to the request of the service provider server 210, and transmits the response to the service provider server 210.

According to an embodiment, the digital keys of the service provider servers 210 may be stored in a common storage apparatus in the SE, i.e., the secure region, by dividing the common storage apparatus. When each service provider is to access the digital key, the digital key may be safely stored by authenticating the service provider, identifying authority by referring to the routing table of the digital key, and then allowing an access.

Figure 9:
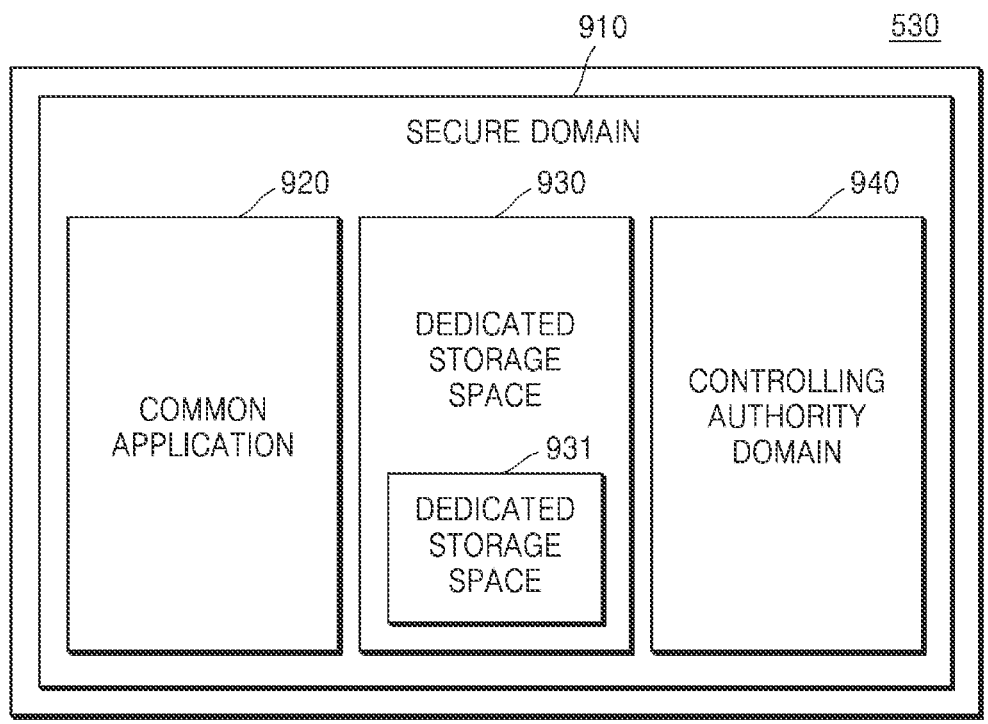
FIG. 9 is a diagram showing a system architecture of a secure element, according to another embodiment.

FIG. 9 is a diagram showing a system architecture of a secure element, according to another embodiment.

Referring to FIG. 9, the secure element 530 may include a secure domain 910, and the secure domain 910 may include a common application 920, a dedicated storage space 930, and a controlling authority domain 940. Also, a dedicated application 931 may be provided in the dedicated storage space 930.

In FIG. 9, basic operations of the secure domain 910, the common application 920, and the controlling authority domain 940 are the same as or similar to those of the secure domain 610, the common application 620, and the controlling authority domain 640 of FIG. 6.

The secure domain 910 is a completely isolated space in the secure element 530 and performs security-related operations.

The common application 920 includes an applet or application driven in the secure element 530. In a digital key-related service, the common application 920 may provide functions, such as generation and management of a digital key, to several service providers in a shared form. The common application 920 may be pre-provided in the electronic device 100 or may be loaded or installed later upon a user request. The common application 920 may provide a routing function when an external entity requests the secure element 530. For example, the common application 920 may determine to which dedicated storage space 930 an instruction is to be transmitted.

The dedicated storage space 930 is a storage space located in the secure domain 910 and is a functionally isolated space to store a digital key for each service provider or for each target device. According to an embodiment, the dedicated storage space 930 may be referred to as a target device package. Also, the dedicated storage space 930 may include the dedicated application 931 for providing a service regarding the digital key to the dedicated storage space 930. The dedicated application 931 may include a space and function for storing the digital key for each target device or for each service provider.

Figure 10:
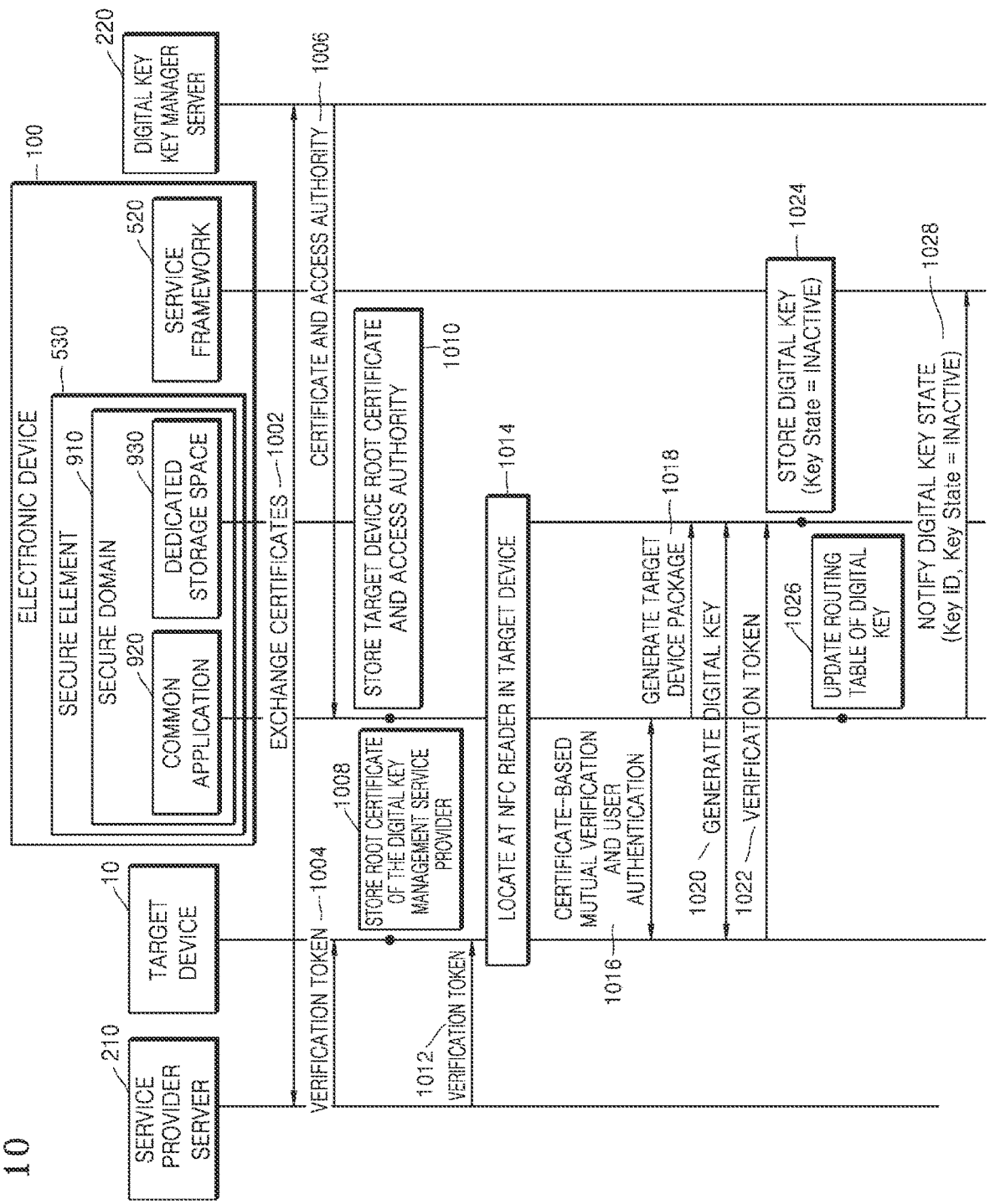
FIGS. 10 and 11 are detailed flowcharts of a method of storing a digital key, according to another embodiment.
Figure 11:
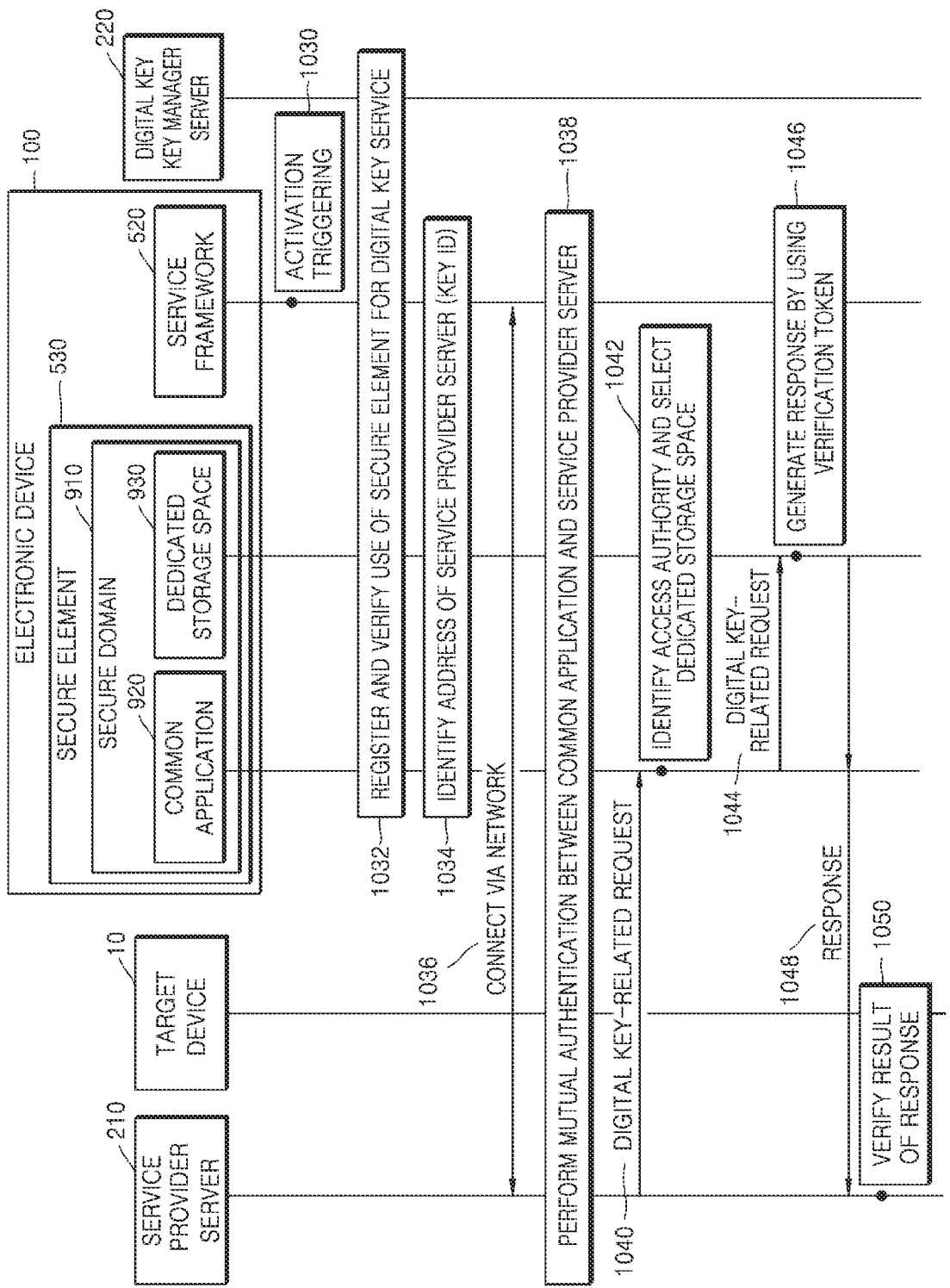

FIGS. 10 and 11 are detailed flowcharts of a method of storing a digital key, according to another embodiment.

In FIGS. 10 and 11, details overlapping those of FIGS. 7 and 8 are briefly described.

Referring to FIGS. 10 and 11, first, in operation 1002, the service provider server 210 and the digital key manager server 220 exchange certificates with each other. Then, in operation 1004, the service provider server 210 may transmit, to the target device 10, root certificate of the digital key management service provider received in operation 1002, and in operation 1008, the target device 10 may store the received certificate of the digital key management service provider. In operation 1006, the digital key manager server 220 transmits the certificate of the service provider received in operation 1002 to the electronic device 100. Here, the digital key manager server 220 may transmit access authority information together with the certificate. Here, the access authority information is about an access authority when the service provider server 210 access the common application, and for example, may include an access number of times, an access command, and a validity date. Then, the electronic device 100 may store the received certificate and access authority information of the service provider, in operation 1010.

In operation 1012, the service provider server 210 may transmit a verification token to the target device 10. Here, the verification token may be used to verify communication between the service provider server 210 and the dedicated storage space 930 corresponding to the service provider server 210. In FIG. 10, the verification token is transmitted in operation 1012, but an embodiment is not limited thereto and the verification token may be transmitted to the target device 10 in any operation before a digital key is generated (operation 1022).

In operation 1014, the target device 10 and the electronic device 100 may be located at a distance capable of short range communication and in operation 1016, authentication may be performed on the target device 10 and the user of the electronic device 100. Then, in operation 1018, the dedicated storage space 930 is generated and the dedicated application 931 for providing a service regarding a digital key may be installed in the dedicated storage space 930. Communication with the dedicated storage space 930 thereafter may be understood as communication with the dedicated application 931.

Then, in operation 1020, the dedicated application 931 generates the digital key and in operation 1022, the target device 10 may transmit the verification token to the dedicated application 931. In operation 1024, the generated digital key may be stored in the dedicated storage space 930.

Then, in operation 1026, the dedicated application 931 updates a routing table of the digital key. In operation 1028, the digital key that needs to be activated and related information are stored in the service framework 520, and in operation 1030, when the electronic device 100 enters a region connectable to a network, i.e., a region where communication is possible, the service framework 520 may automatically or manually trigger that activation is required. Operation 1032 is a process of registering and verifying the use of a secure element for the digital key service. In operation 1034, to perform the activation based on the service provider server 210, an address of the service provider server 210 may be identified. Then, when the electronic device 100 and the service provider server 210 are connected via a network in operation 1036, mutual authentication between the common application 620 and the service provider server 210 is performed in operation 1038 as the service framework 520 performs a function of a massage forwarder.

In operation 1040 the service provider server 210 may request a service related to the digital key via a message. Here, a challenge may also be transmitted to identify whether a dedicated storage space corresponding to the service provider server 210 is accessed. In operation 1042, the common application 920 identifies a storage location of the digital key stored in a common storage space and an access authority regarding the digital key by referring to the routing table of the digital key and then selects the dedicated storage space 930 corresponding to the service provider server 210. Next, the request for the service related to the digital key and the challenge are transmitted to the dedicated application 931 in operation 1044, and the dedicated application 931 generates a response to the request related to the digital key by using the verification token in operation 1046 and transmits the response to the service provider server 210 in operation 1048. In particular, the dedicated application 931 may transmit, to the service provider server 210, a result regarding the challenge together with the response to the request related to the digital key, by using the verification token. Then, the service provider server 210 may verify whether the response is generated based on the digital key stored in the dedicated storage space corresponding to the service provider server 210, based on a result of the challenge in operation 1050.

According to an embodiment, digital keys of service providers may be stored in the dedicated storage spaces 930 that are safely divided. When each service provider is to access the digital key, the digital key may be safely stored by authenticating the service provider, identifying authority of the service provider by referring to the routing table of the digital key, and then allowing an access to a particular dedicated storage space. Moreover, the service provider may identify, via the service provider server 210 through the challenge, whether the response from the electronic device 100 is about the digital key stored in the dedicated storage space 920 corresponding to the service provider.

Figure 12:
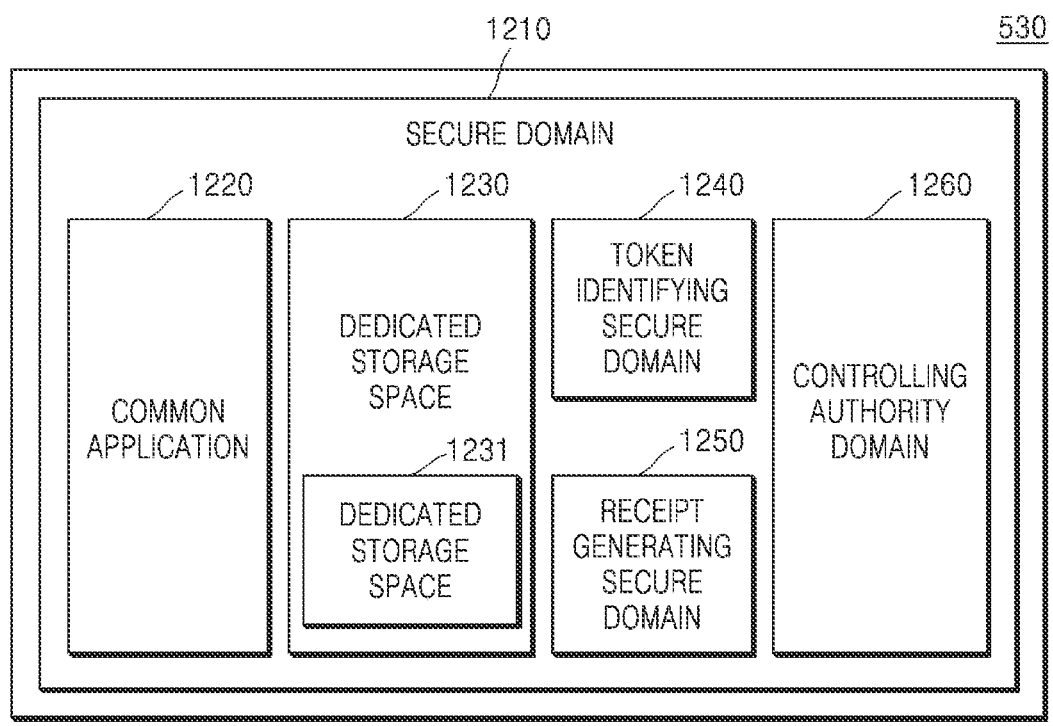
FIG. 12 is a diagram showing a system architecture of a secure element, according to another embodiment.

FIG. 12 is a diagram showing a system architecture of a secure element, according to another embodiment.

Referring to FIG. 12, the secure element 530 includes a secure domain 1210, and the secure domain 1210 may include a common application 1220, a dedicated secure domain 1230 (may be referred as dedicated secure storage space), a token identifying secure domain 1240, a receipt generating secure domain 1250, and a controlling authority domain 1260. Also, a dedicated application 1231 may be provided in the dedicated secure domain 1230.

Basic operations of the secure domain 1210, common application 1220, and controlling authority domain 1260 of FIG. 12 are the same as or similar to those of the secure domain 610 or 910, common application 620 or 920, and controlling authority domain 640 or 940 of FIG. 6 or 9.

The secure domain 1210 is a completely isolated space in the secure element 530 and performs security-related operations.

The common application 1220 includes an applet or application driven in the secure element 530. In a digital key-related service, the common application 1220 may provide functions, such as generation and management of a digital key, to several service providers in a shared form. The common application 1220 may be pre-provided in the electronic device 100 or may be loaded or installed later upon a user request. The common application 1220 may provide a routing function when an external entity requests the secure element 530. For example, the common application 1220 may determine to which dedicated secure domain 1230 an instruction is to be transmitted.

The dedicated secure domain 1230 is a secure domain that is functionally isolated and present below the secure domain 1210, and has delegated management privilege. An external entity managed by the secure domain 1210 may access the dedicated secure domain 1230 by verifying a use authority. In other words, the dedicated secure domain 1230 functions as a type of agent and any entity may use a service of the dedicated secure domain 1230 by verifying an access authority.

The token identifying secure domain 1240 performs a function of verifying the access authority when the external entity accesses the dedicated secure domain 1230, and the receipt generating secure domain 1250 performs a function of notifying the external entity of use details after the access.

The dedicated secure domain 1230 is a storage space located in the common application 1220 or secure element 530 and is a functionally isolated space to store a digital key for each service provider or for each target device. According to an embodiment, the dedicated secure domain 1230 may be referred to as a target device package. Also, the dedicated secure domain 1230 may include the dedicated application 1231 for providing a service regarding the digital key to the dedicated secure domain 1230. The dedicated application 1231 may include a space and function for storing the digital key for each target device or for each service provider.

Figure 13:
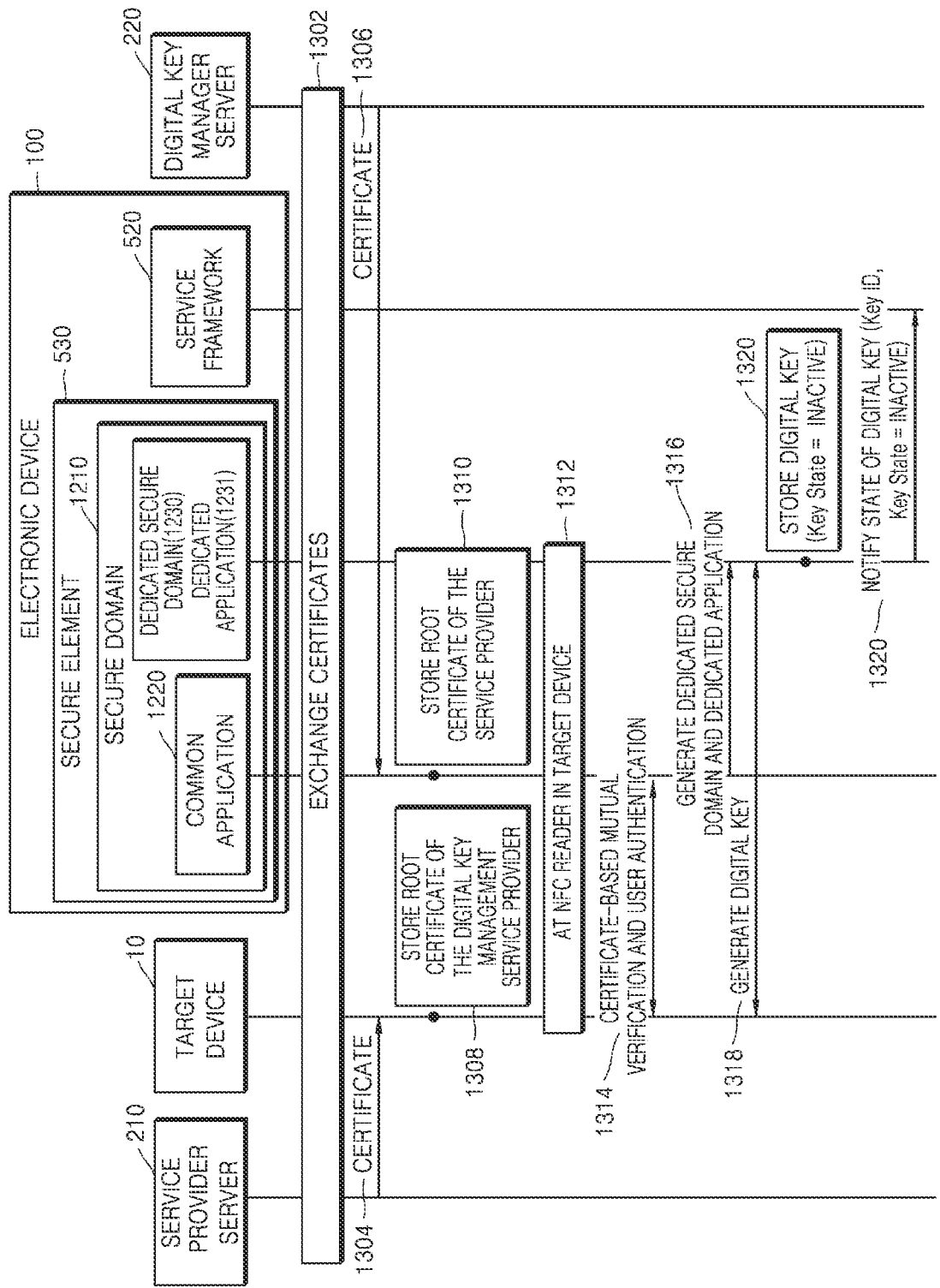
FIGS. 13 and 14 are detailed flowcharts of a method of storing a digital key, according to another embodiment.
Figure 14:
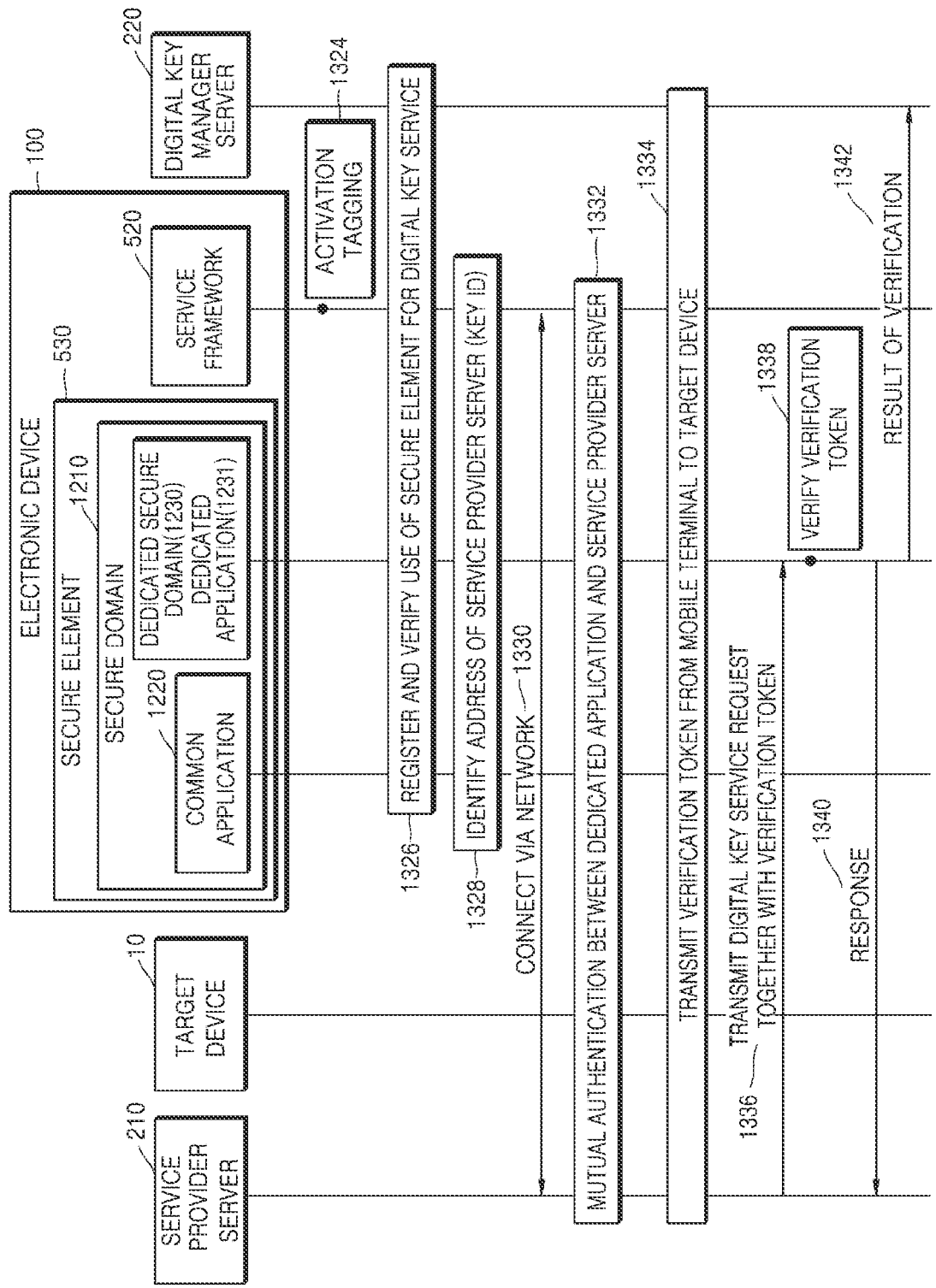

FIGS. 13 and 14 are detailed flowcharts of a method of storing a digital key, according to another embodiment.

In FIGS. 13 and 14, details overlapping those of FIGS. 7 and 8, and FIGS. 10 and 11 are briefly described.

Referring to FIGS. 13 and 14, first, in operation 1302, the service provider server 210 and the digital key manager server 220 exchange certificates with each other. Then, in operation 1304, the service provider server 210 may transmit, to the target device 10, root certificate of the digital key management service provider received in operation 1302, and the target device 10 may store the received certificate of the digital key management service provider. In operation 1306, the digital key manager server 220 transmits the certificate of the service provider received in operation 1302 to the electronic device 100. Then, the electronic device 100 may store the received certificate and access authority information of the service provider, in operation 1310.

In operation 1312, the target device 10 and the electronic device 100 may be located at a distance capable of short range communication and in operation 1314, authentication may be performed on the target device 10 and the user of the electronic device 100. Then, in operation 1316, the dedicated secure domain 1230 is generated and the dedicated application 1231 for providing a service regarding a digital key may be installed in the dedicated secure domain 1230. Thereafter, communication with the dedicated secure domain 1230 thereafter may be understood as communication with the dedicated application 1231.

Next, the dedicated application 1231 generates a digital key in operation 1318 and store the generated digital key in the dedicated secure domain 1230 and in operation 1320.

Then, in operation 1322, the digital key that needs to be activated and related information are stored in the service framework 520, and in operation 1324, when the electronic device 100 enters a region connectable to a network, i.e., a region where communication is possible, the service framework 520 may automatically or manually trigger that activation is required. Operation 1326 is a process of registering and verifying the use of a secure element for the digital key service. In operation 1328, to perform the activation based on the service provider server 210, an address of the service provider server 210 may be identified. Then, when the electronic device 100 and the service provider server 210 are connected via a network in operation 1330, mutual authentication between the dedicated application 1231 and the service provider server 210 is performed in operation 1332 as the service framework 520 performs a function of a massage forwarder.

In operation 1334, a verification token generated by the dedicated application 1231 is transmitted to the service provider server 210 in operation 1334. Here, the verification token may be transmitted via the digital key manager server 220 or directly transmitted to the service provider server 210, and in this case, the verification token may be encrypted by using the certificate received in operation 1306 to be transmitted.

In operation 1336, the service provider server 210 may request a service related to the digital key via a message. Here, the verification token may also be transmitted to identify whether the dedicated secure domain 1230 corresponding to the service provider server 210 is accessed. In operation 1339, the token identifying secure domain 1240 may verify the received verification token. When the verification token is valid, the dedicated application 1231 may generate a response to the request related to the digital key and transmit the response to the service provider server 210 in operation 1340. Then, in operation 1342, the receipt generating secure domain 1250 transmits a result of the verification to the digital key manager server 220.

According to an embodiment, digital keys of service providers may be stored in the dedicated secure domain 1230 that are safely divided. When each service provider is to access the digital key, the digital key may be safely stored by authenticating the service provider and allowing an access to a particular dedicated secure domain 1230. In addition, the electronic device 100 may identify whether the access of the service provider is valid by using the verification token received by the service provider server 210 from the electronic device 100.

Meanwhile, the above-described embodiments may be written as a program executable on a computer and may be implemented in a general-purpose digital computer operating the program using a computer-readable recording medium. In addition, a structure of the data used in the above-described embodiments may be recorded on a computer-readable medium through various methods. The above-described embodiments may also be realized in a form of a computer program product including a recording medium including instructions executable by a computer, such as a program module executed by a computer. For example, methods implemented by a software module or algorithm may be stored in a computer-readable recording medium as computer-readable and executable codes or program instructions.

A computer-readable recording medium may be an arbitrary recording medium accessible by a computer, and examples thereof may include volatile and non-volatile media and separable and non-separable media. A computer-readable medium may include, but is not limited to, a magnetic storage medium, for example, read-only memory (ROM), floppy disk, hard disk, or the like, an optical storage medium, for example, CD-ROM, DVD, or the like. Further, examples of the computer-readable recording medium may include a computer storage medium and a communication medium.

Also, a plurality of computer-readable recording media may be distributed over network-coupled computer systems, and data stored in the distributed recording media, for example, program instructions and codes, may be executed by at least one computer.

Hereinabove, the embodiments of the disclosure have been described with reference to the accompanying drawings, but it will be understood by one of ordinary skill in the art that the disclosure may be executed in other specific forms without changing technical ideas or essential features. Accordingly, the above embodiments are examples only in all aspects and are not limited.

The invention claimed is:

1. An electronic device for storing a digital key for controlling and accessing a target device, the electronic device comprising:
   a communicator;
   a secure element;
   a memory; and
   a processor,
   wherein the secure element is configured to:
      authenticate the target device and user information by performing short range communication with the target device,
      generate the digital key for the target device,
      store the generated digital key in one region of the secure element based on an index, and
      update a routing table regarding the generated digital key,
   wherein the index is distinguished for each of at least one service provider.

2. The electronic device of claim 1, wherein the secure element is further configured to activate the digital key and perform authentication between a common application in the secure element and a service provider server by connecting the common application and the service provider server.

3. The electronic device of claim 2, wherein the secure element is further configured to:
   when a request related to the digital key is received from the service provider server, identify, based on the routing table, a storage location of the digital key in the service provider server and an access authority of the service provider server regarding the digital key, and
   when the service provider server has the access authority, control the common application to generate a response to the request related to the digital key and transmit the response to the service provider server.

4. The electronic device of claim 1, wherein the secure element is further configured to:
   generate, in one region of the secure element, a dedicated storage space that is functionally isolated to store the digital key for each of at least one service provider or for each of at least one target device;
   install, in the dedicated storage space, a dedicated application for providing a service regarding the digital key,
   store the generated digital key in the dedicated storage space by distinguishing the generated digital key for each of at least one service provider, and update the routing table regarding the generated digital key.

5. The electronic device of claim 4, wherein the secure element is further configured to activate the digital key and perform authentication between a common application in the secure element and a service provider server by connecting the common application and the service provider server.

6. The electronic device of claim 5, wherein the secure element is further configured to:
   receive access authority information of the service provider server from a digital key manager server and receive a verification token from the target device,
   when a request related to the digital key is received from the service provider server, control the common application to identify, based on the routing table, a storage location of the digital key in the service provider server and an access authority of the service provider server regarding the digital key, and
   when the service provider server has the access authority regarding the digital key, control the dedicated application to generate a response to the request related to the digital key by using the verification token and transmit the response to the service provider server.

7. The electronic device of claim 1, wherein the secure element is further configured to:
   generate, in one region of the secure element, a dedicated secure domain that is functionally isolated and accessible when a use authority is verified to store the digital key for each of at least one service provider or for each of at least one target device; and
   install, in the dedicated secure domain, a dedicated application for providing a service regarding the digital key, and store the generated digital key in the dedicated secure domain by distinguishing the generated digital key for each of at least one service provider.

8. The electronic device of claim 7, wherein the secure element is further configured to activate the digital key and perform authentication between the dedicated application in the secure element and a service provider server by connecting the dedicated application and the service provider server.

9. The electronic device of claim 8, wherein the secure element is further configured to:
   transmit, to a digital key manager server, a verification token for accessing the dedicated secure domain, and
   when the verification token and a request related to the digital key are received from the service provider server, perform verification regarding the verification token and when the verification token is valid, control the dedicated application to generate a response to the request related to the digital key, and transmit the response to the service provider server.

10. A method of storing a digital key for controlling and accessing a target device, the method comprising:
    authenticating the target device and user information by performing short range communication with the target device;
    generating the digital key for the target device;
    storing the generated digital key in one region of a secure element based on an index; and
    updating a routing table regarding the generated digital key,
    wherein the index is distinguished for each of at least one service provider.

11. The method of claim 10, further comprising:
    activating the digital key; and
    performing authentication between a common application in the secure element and a service provider server by connecting the common application and the service provider server.

12. The method of claim 10, further comprising:
    before generating the digital key, generating a dedicated storage space that is functionally isolated to store, in one region of the secure element, the digital key for each of at least one service provider or for each of at least one target device; and
    installing, in the dedicated storage space, a dedicated application for providing a service regarding the digital key,
    wherein storing the generated digital key comprises:
       storing the generated digital key in the dedicated storage space by distinguishing the generated digital key for each of at least one service provider; and
       updating the routing table regarding the generated digital key.

13. The method of claim 10, further comprising:
    before generating the digital key, generating a dedicated secure domain that is functionally isolated and accessible when a use authority is verified to store, in one region of the secure element, the digital key for each of at least one service provider or for each of at least one target device; and installing, in the dedicated secure domain, a dedicated application for providing a service regarding the digital key, wherein the storing of the generated digital key comprises storing the generated digital key in the dedicated secure domain by distinguishing the generated digital key for each of at least one service provider.

\* \* \* \* \*